US012433422B2

(12) United States Patent
Prince, Jr.

(10) Patent No.: US 12,433,422 B2
(45) Date of Patent: Oct. 7, 2025

(54) BEDDING COMPONENTS INCLUDING ADDITIVELY MANUFACTURED POLYMERIC LATTICE STRUCTURES

(71) Applicant: DREAMWELL, LTD., Doraville, GA (US)

(72) Inventor: Victor Ray Prince, Jr., Chamblee, GA (US)

(73) Assignee: DREAMWELL, LTD., Doraville, GA (US)

( * ) Notice: Subject to any disclaimer, the term of this patent is extended or adjusted under 35 U.S.C. 154(b) by 605 days.

(21) Appl. No.: 17/552,320

(22) Filed: Dec. 15, 2021

(65) Prior Publication Data

US 2022/0395109 A1 Dec. 15, 2022

Related U.S. Application Data

(60) Provisional application No. 63/208,707, filed on Jun. 9, 2021.

(51) Int. Cl.
*A47C 27/20* (2006.01)
*A47C 27/045* (2006.01)
(Continued)

(52) U.S. Cl.
CPC .......... *A47C 27/20* (2013.01); *A47C 27/0456* (2013.01); *B33Y 10/00* (2014.12); *B33Y 80/00* (2014.12)

(58) Field of Classification Search
CPC ....... A47C 27/00; A47C 27/001; A47C 27/04; A47C 27/045; A47C 27/0453; A47C 27/0456; A47C 27/05; A47C 27/06; A47C 27/061; A47C 27/062; A47C 27/12; A47C 27/121; A47C 27/20; A47C 23/04; A47G 9/10; A47G 9/1009; A47G 9/1027;
(Continued)

(56) References Cited

U.S. PATENT DOCUMENTS

| 2,588,823 | A | * | 3/1952 | Glassman | ............... | A47C 27/15 |
| | | | | | | 5/655.9 |
| 6,238,467 | B1 | * | 5/2001 | Azarian | ................. | B01D 46/10 |
| | | | | | | 96/135 |

(Continued)

FOREIGN PATENT DOCUMENTS

EP 3512379 B1 10/2020

OTHER PUBLICATIONS

International Preliminary Report on Patentability of the PCT mailed Nov. 21, 2023 for PCT/US2022/032666 filed Jun. 8, 2022, 13 pages.

(Continued)

*Primary Examiner* — George Sun
(74) *Attorney, Agent, or Firm* — CANTOR COLBURN LLP (57) ABSTRACT

Bedding components and processes for forming the bedding components includes an additive manufacturing process to produce a variable elastomeric lattice structure. The variable elastomeric lattice structure includes variations in strut diameter, cell diameter, strut shape, and combinations thereof. The bedding components include mattresses, pillows, coils, mattress toppers or the like and can also be in the form of inserts to provide different feels in different regions.

19 Claims, 10 Drawing Sheets

(51) Int. Cl.
    *B33Y 10/00*         (2015.01)
    *B33Y 80/00*         (2015.01)

(58) Field of Classification Search
    CPC .. A47G 9/1036; A47G 9/1045; A47G 9/1054;
                A47G 9/1063; A47G 9/1072; A47G
              9/1081; A47G 9/109; A47G 2009/1018;
                            B33Y 10/00; B33Y 80/00
    See application file for complete search history.

(56) References Cited

U.S. PATENT DOCUMENTS

| | | | | |
|---|---|---|---|---|
| 6,669,184 | B2* | 12/2003 | Cai | F16F 1/328 |
| | | | | 267/180 |
| 10,398,236 | B2 | 9/2019 | Achten et al. | |
| 2007/0118991 | A1* | 5/2007 | Nakayama | A47G 9/109 |
| | | | | 5/636 |
| 2008/0301983 | A1* | 12/2008 | Murphy | G09F 23/00 |
| | | | | 5/690 |
| 2010/0071136 | A1* | 3/2010 | Weber | B29C 44/5627 |
| | | | | 156/251 |
| 2010/0200001 | A1* | 8/2010 | Randall | A61F 5/56 |
| | | | | 128/845 |
| 2013/0096887 | A1* | 4/2013 | Fee | F16F 1/3605 |
| | | | | 267/153 |
| 2013/0145555 | A1 | 6/2013 | Hargreaves et al. | |
| 2014/0183403 | A1* | 7/2014 | Peterson | A47C 27/15 |
| | | | | 252/75 |
| 2015/0308533 | A1* | 10/2015 | DeFranks | A47C 27/05 |
| | | | | 267/144 |
| 2016/0122493 | A1* | 5/2016 | Farris | B29C 44/3453 |
| | | | | 521/82 |
| 2016/0128487 | A1* | 5/2016 | Eskridge, III | A47C 27/14 |
| | | | | 5/423 |
| 2016/0327113 | A1* | 11/2016 | Shelley | B32B 27/20 |
| 2018/0070736 | A1* | 3/2018 | Achten | B29C 64/106 |
| 2018/0071979 | A1* | 3/2018 | Achten | B29C 64/141 |
| 2019/0254439 | A1 | 8/2019 | Achten et al. | |
| 2019/0330049 | A1* | 10/2019 | Sama | B68G 1/00 |
| 2020/0178697 | A1* | 6/2020 | Mantzis | B65B 11/00 |
| 2020/0205589 | A1* | 7/2020 | Ho | A61F 5/56 |
| 2021/0290434 | A1* | 9/2021 | Chan | G16H 50/50 |
| 2023/0363547 | A1* | 11/2023 | Shinohara | B29C 64/129 |

OTHER PUBLICATIONS

International Search Report of the ISA/EPO mailed Nov. 10, 2022 for PCT/US2022/032666 filed Jun. 8, 2022, 5 pages.
Written Opinion of the ISA/EPO mailed Nov. 10, 2022 for PCT/US2022/032666 filed Jun. 8, 2022, 12 pages.

* cited by examiner

BEDDING COMPONENTS INCLUDING ADDITIVELY MANUFACTURED POLYMERIC LATTICE STRUCTURES

CROSS REFERENCE TO RELATED APPLICATIONS

The present application claims the benefit of Provisional Application No. 63/208,707 filed on Jun. 9, 2021, incorporated herein by reference in its entirety.

BACKGROUND

The present disclosure is generally directed to bedding components, mattresses, and processes for manufacturing the mattresses and bedding components, and more particularly, to additive manufacturing of polymeric lattice structures to form the mattresses and bedding components.

Conventional bedding cushioning components such as mattresses, pillows and the like exist as static, homogenous, category-based feel designations dictated by available materials and mass production requirements. Foams, springs, padding, feathers, fibers, combinations thereof, and other traditional fill materials can only vary the feel characteristics to the end user in uniform ways. Traditional designs include the use of material layering, variable surface cut geometry in rare cases, perforations, or additives to target the desired pressure and thermal relief. The overall designs are relatively simple and amenable to manufacturing. Moreover, with respect to certain fill materials such as foam, these materials are known to retain heat and require heat absorption or active cooling materials integrated therein or the use of external devices to dissipate retained heat. Still further, the use of the above materials as bedding components are generally dense materials that can be bulky and/or heavy.

Additive manufacturing (AM) processes, also referred to as three-dimensional printing process generally include a sequential layer by layer build-up of a three-dimensional object of any shape from a design. In a typical AM process, a two-dimensional image of a first layer of a polymeric material is formed, and subsequent layers are then added one by one until such time a three-dimensional article is formed. Typically, the three-dimensional article is fabricated using a computer aided design (CAD) model. A particular type of AM process uses an energy beam, for example, an electron beam or electromagnetic radiation such as a laser beam, to photocatalytically create each layer of the lattice structure in which one or more monomers are polymerized or copolymerized and, where indicated, bonded to the underlying layer.

BRIEF SUMMARY

Disclosed herein are bedding components and processes for forming the bedding components. The bedding components generally include an elastomeric lattice structure formed using an additive manufacturing process. In one or more embodiments, the elastomeric lattice structure has a variable density having different strut shapes, or different cell diameters, or different strut diameters or combinations thereof. The bedding components can include pillows, mattresses and portions of pillows and mattresses such as, for example, coil structures, zoned inserts, and the like as may be desired for different applications.

In one or more embodiments, a process for producing a three-dimensional variable density lattice structure for a bedding component includes generating a contour map of pressure and/or temperature map from an end user using a conventional bedding product; designing a bedding component consisting of a variable density polymeric lattice structure configured to minimize pressure points and/or temperature hot spots observed from the contour map of pressure and/or the temperature map, respectively; and fabricating the variable density polymeric lattice structure as an insert for use with the conventional bedding product or as a replacement of the conventional bedding product using an additive manufacturing process, wherein the number of pressure points and/or hot spots is reduced relative to the conventional bedding component.

In one or more embodiments, a bedding component includes a polymeric lattice structure made up of struts and cells with one or more dimensions such as strut diameter, cell diameter, and strut shape varied to achieve desired properties.

In one or more embodiments, a multilayer mattress assembly includes at least one layer comprising a plurality of spring coils, wherein the spring coils comprise additively manufactured variable density elastomeric coil structures, wherein the variable density coil structures comprise different strut shapes, or different cell diameters, or different strut diameters or combinations thereof.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

The present disclosure is generally directed to additively manufactured (AM) bedding components that are in the form of resilient three-dimensional polymeric lattice structures. As will be described in greater detail below, the three-dimensional polymeric lattice structures can be used to define pillows, mattresses, inserts for use with mattresses, portions of a mattress or a pillow such as a specific layer or layers and/or coils, and the like. In one or more embodiments, the bedding components including the three-dimensional polymeric lattice structures are formed using a light activated or thermal additive manufacturing process. The resilient three-dimensional polymeric lattice structure can be varied or constant for an intended application and designed using information obtained from pressure and/or temperature mapping on a conventional sleep surface to optimize a design for pressure relief and/or temperature management as well as create simple as well as complex three-dimensional structures unique to bedding components and mattresses.

Exemplary bedding components including the additively manufactured three-dimensional polymeric lattice structure include mattresses (in whole or in part), pillows, cushions, foam layers, spring layers, mattress toppers, and the like. Additionally, the bedding components can include formation of inserts of the additively manufactured three-dimensional polymeric lattice structure for insertion into one or more layers defining the particular bedding component to provide zones having different firmness levels and/or airflow properties relative to other portions of the one or more layers of a conventional bedding component, for example. The resilient three-dimensional polymeric lattice structures can further include integrated fastening systems that reduce or eliminate the need for secondary fasteners or adhesives. In this manner, additive manufacturing apparatuses that have limitations on the maximum size of the bedding component that can be manufactured can be used to form portions of a bedding component that can subsequently be fastened to one another using the integrated fastening systems to form the bedding component in its entirety.

The light activated polymerization additive manufacturing process is not intended to be limited to any particular process or three-dimensional printing apparatus as known in the art and generally includes exposing a surface of a liquid monomeric or liquid polymeric composition to a radiation source. The liquid monomeric or liquid polymeric composition generally includes one or more monomers or crosslinkable polymer(s) and a photocatalyst (e.g., a polymerization catalyst or a light activated cross linker) in a vessel, which is also generally referred to in the art as a VAT photopolymerization process, to form a first patterned two-dimensional layer of a solidified polymer wherever the activating radiation strikes the surface of the liquid. Once a desired two-dimensional pattern of solidified polymer is formed, a stage supporting the two-dimensional pattern of the solidified polymer first layer is lowered a relatively small distance into the vessel and submerged into the liquid so that a second patterned layer can be formed on the first patterned layer. The process is repeated until the desired three-dimensional resilient lattice structure is formed. In this manner, the AM processes of the present disclosure can be used to directly synthesize polymers into complex geometries, which can be configured to provide a desired level of support, airflow, and minimal weight.

Exemplary and suitable photopolymerization additive manufacturing processes include, without limitation, digital light processing (DLP), stereolithography (SLA), continuous liquid interface production by carbon (CLIP), daylight polymer printing, and the like. For compositions including a photocatalyst (i.e., photoinitiator), the radiation source is not intended to be limited and is generally chosen to provide activating radiation at a particular wavelength or range suitable for photocatalysis or photoinitiation to form the solidified variable density three-dimensional lattice structure layer-by-layer.

The thermal additive manufacturing process, also referred to as powder bed fusion, generally includes providing a powdered layer of polymeric particles, which are then subjected to a selective melting process using heat from a laser energy beam or E-beam or the like to selectively melt a pattern in the powder layer followed by solidifying upon cooling to define a two-dimensional solidified image in the layer. The selective melting process generally includes heating the polymer particles above its glass transition temperature. The energy beam can be caused to move over the powdered layer in a desired pattern to form a melted portion of the layer and define the two-dimensional patterned image in the layer, which is then repeated to form the three-dimensional lattice structure layer by layer. The selective melting process can be conducted in an inert atmosphere, under vacuum, or under a partial vacuum.

Unique methods of optimizing print dimensions of existing print methods are demonstrated to improve production economics. These efficiency improvements are designed to maximize surface area of the produced part while minimizing amount of material used, which can be verified using pressure and/or temperature mapping to ensure the desired efficacy.

The present disclosure is not intended to be limited to any specific monomer or polymer used in the additive manufacturing process. These materials are generally known in the art as well as various photocatalysts and crosslinkers. The resulting three dimensional polymeric lattice structure are generally fabricated with materials to provide resiliency and can be formed of natural or synthetic elastomeric polymers such as, but not limited to, natural rubber, polyisobutylene, polybutadiene, and styrene-butadiene rubber, butyl rubber, polyisoprene, styrene-isoprene rubber, ethylene propylene diene rubber, silicone, polyurethane, polyester-polyether, hydrogenated and non-hydrogenated nitrile rubber, halogen-modified elastomers, fluoroelastomers, and combinations thereof. Similarly, one or more monomers can be selected to form any of the above polymers utilizing well known monomers and catalysts.

Advantageously, relative to conventional manufacturing processes and the multitude of materials used to form the bedding components, the AM process to form the bedding components including a three-dimensional polymeric lattice structure design can result in improved pressure management, improved temperature management, improved air flow circulation, simplified construction of complex geometries not previously attainable, improved weight and density control, fewer raw materials needed resulting in fewer sourcing dependencies, zoned comfort as desired without added manufacturing complexity, and the added capability of including sensors or various combinations thereof to the bedding component as it is being built so as to improve feedback metrics for iterative improvements.

Conventional techniques related to AM processes for forming the three-dimensional bedding components may or may not be described in detail herein. Moreover, the various tasks and process steps described herein can be incorporated into a more comprehensive procedure or process having additional steps or functionality not described in detail herein. In particular, various steps in the additive manufacture of three-dimensional articles are generally well known and so, in the interest of brevity, many conventional steps will only be mentioned briefly herein or will be omitted entirely without providing the well-known process details.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Figure 1:
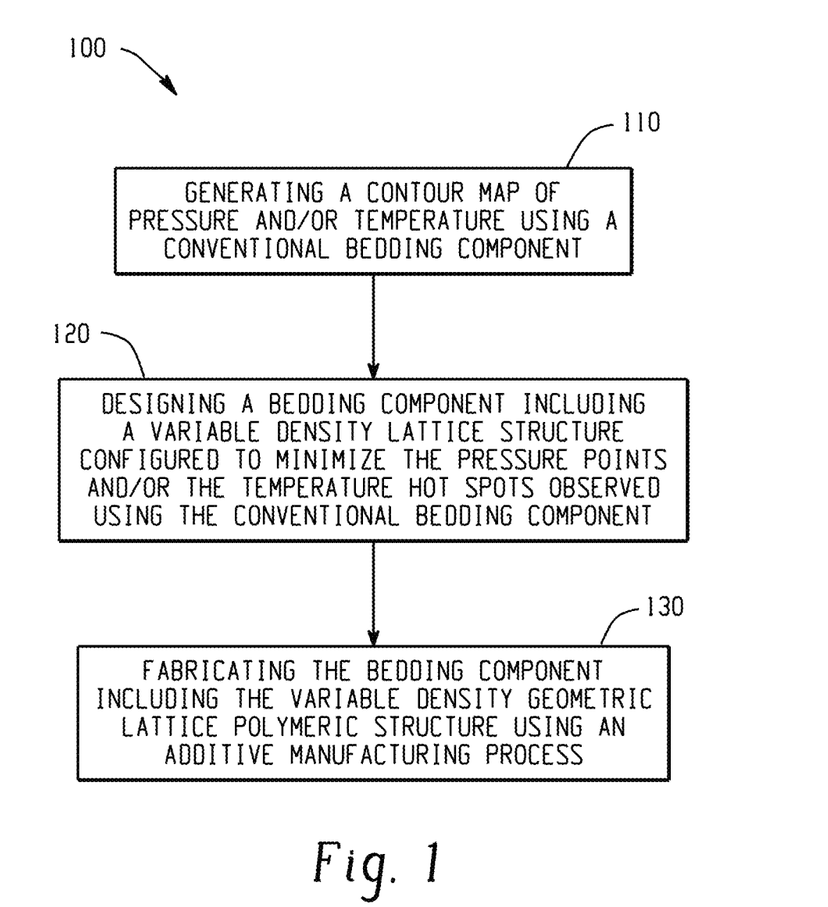
FIG. 1 is a flow chart of an exemplary additive manufacturing process for fabricating a three-dimensional polymeric lattice structure bedding component in accordance with one or more embodiments of the present invention.

Turning now to FIG. 1, there is shown a flowchart of an exemplary AM process 100 suitable for forming a three-dimensional bedding component including a polymeric lattice structure. The AM process is not intended to be limited and may include additional steps than that previously described, which are not explicitly explained. Moreover, the AM process can be a photopolymerization AM process or a thermal AM process as generally described above.

Figures 2A, 2B:
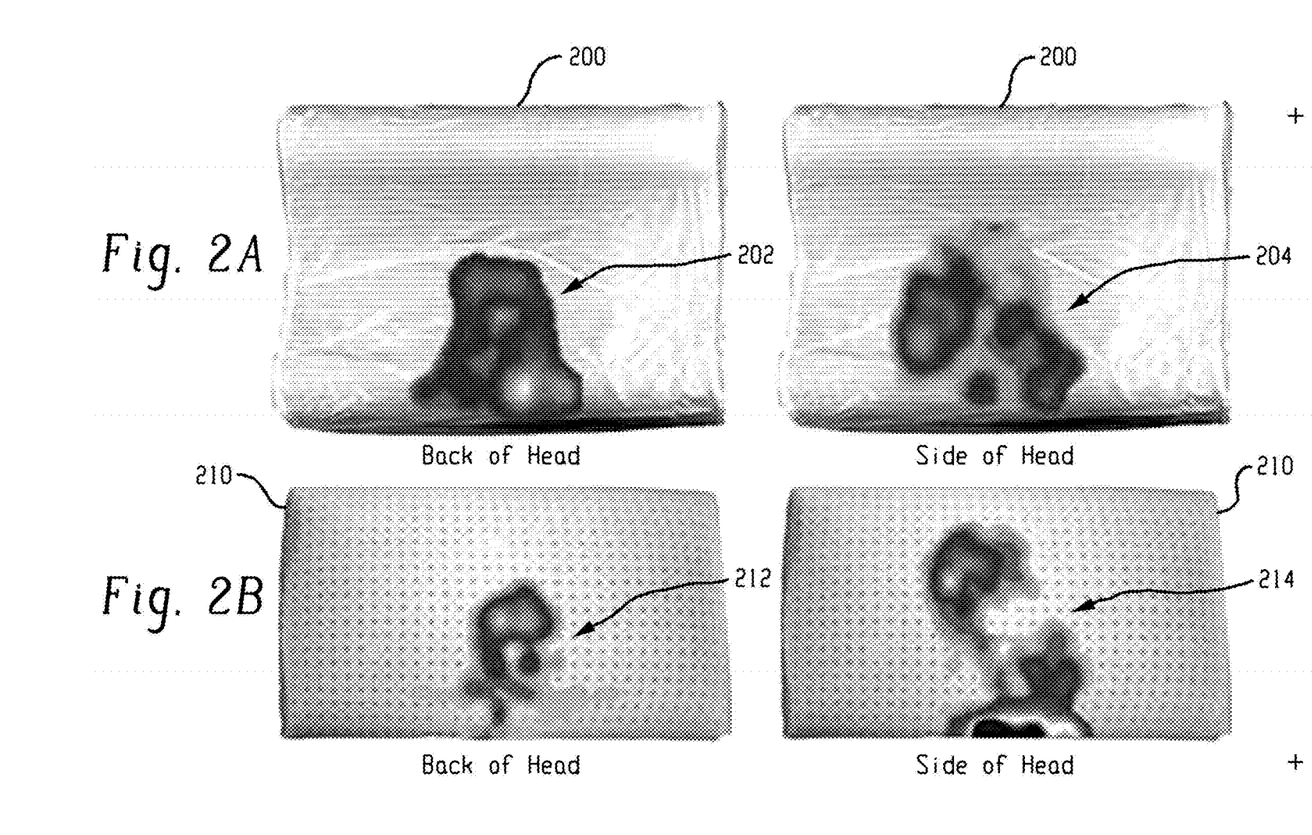
FIGS. 2A and 2B illustrate back of head and side of head pressure and temperature contour plots from an end user utilizing a conventional pillow.

In step 110, a pressure contour map and/or a temperature contour map of an end user is generated on or with a conventional bedding component. For example, pressure contour maps and/or temperature maps can be generated from an end user's sleeping interaction with a conventional pillow as is shown in FIGS. 2A and 2B for two different commercially available pillow types 200, 210, respectively. Pillow-type 200 includes a contoured rectangular shape having a curvilinear shaped from the front of the pillow to the back of the pillow whereas pillow-type 210 includes a standard oblong shape. The contour maps for each pillow type provide detail for a head position corresponding to an end user lying on their back 202, 212, respectively and for a side sleeper 204, 214, respectively. The different pillow types are exemplary and illustrate the immediate and measurable benefits that can be obtained by manufacturing a variable density pillow.

In step 120, data obtained from the pressure and/or temperature contour maps are used to develop three-dimensional computer aided design (CAD) polymeric lattice structures configured to address the pressure and/or temperature issues obtained from the contour maps. The CAD lattice structures can be modeled to provide a desired density and/or airflow profile by changing, for example, cell size, strut size, and overall geometry so as to minimize the pressure points and/or temperature hot spots observed using the conventional bedding component. In one or more embodiments, the lattice structure can have a variable lattice structure or a constant and uniform lattice structure depending on the intended application and/or data obtained from contour mapping using a conventional bedding component. Still further, it should be apparent that the lattice structure can be modeled based on empirical knowledge of the bedding component manufacturer in the absence of contour mapping data.

In step 130, the three-dimensional structure including the desired lattice structure (variable or constant) is fabricated using an additive manufacturing process. By way of example, a vessel containing a liquid photopolymer resin composition is used to form the three-dimensional lattice structure layer-by-layer. A light source, e.g., ultraviolet radiation, is used to harden or cure the resin where required while a platform moves the object being made downwards after each layer is formed. The light source can be applied using, for example, digital light processing to form the two-dimensional image within a given layer. In the DLP process, a digital projector screen is used to flash a single image of each layer across the entire platform at once. Because the projector is a digital screen, the image of each layer is composed of square pixels, resulting in a layer formed from small rectangular bricks called voxels. DLP can achieve faster print times for some parts compared to other processes, as each entire layer is exposed all at once, rather than drawn out with a laser. After completion of each layer to form the three-dimensional bedding component, the vessel is drained, and the bedding component removed. In some applications, a support structure may be utilized that is subsequently removed upon completion of the bedding component. Still further, a blade may be utilized that moves between layers to provide a smooth resin base to build the next layer.

Figure 3:
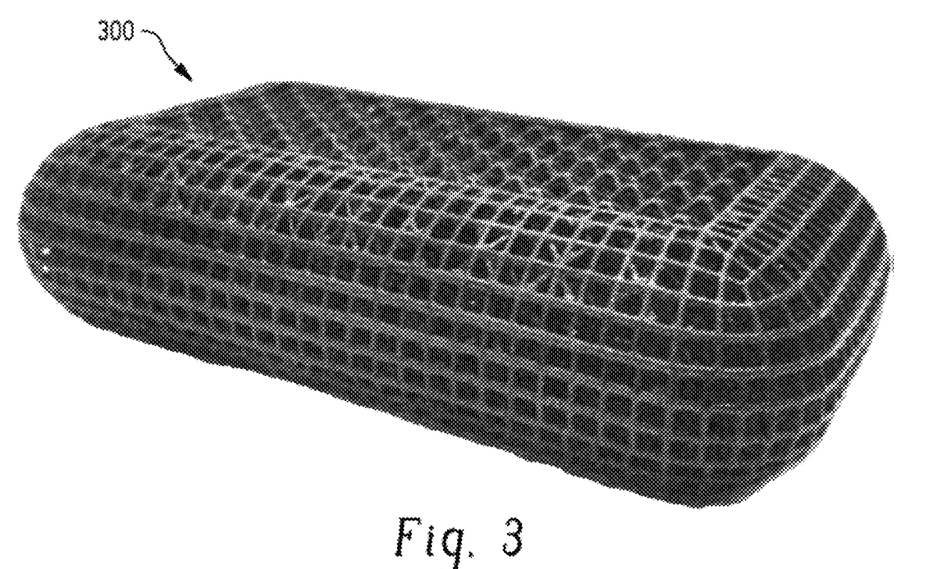
FIG. 3 is a perspective view of a pillow including a variable density polymeric lattice structure based on the pressure and temperature contour plots from the end user utilizing a conventional pillow in accordance with one or more embodiments of the present invention.
Figure 4:
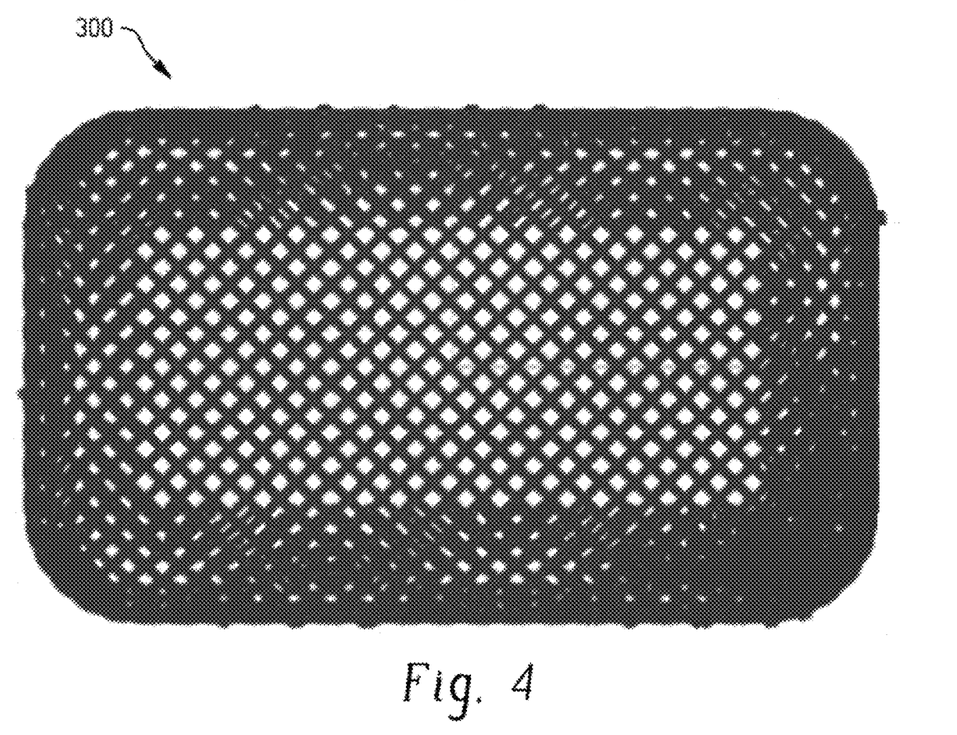
FIG. 4 is a top down view of the pillow of FIG. 3 including the variable density polymeric lattice structure based on the pressure and temperature contour plots from the end user utilizing a conventional pillow in accordance with one or more embodiments of the present invention.

FIGS. 3 and 4 illustrate a perspective and a top-down view of an exemplary pillow 300 including a variable density lattice structure based on the pressure and temperature contour maps obtained using a conventional pillow. The illustrated variable density lattice structure is varied in strut diameter, strut shape, and cell diameter to provide different feels in different regions of the pillow so as to minimize pressure points depending on the end user sleep profile (e.g., side sleeper, back sleeper, or front sleeper) provided in the contour plots. Advantageously, the resulting variable density lattice structure minimizes pressure points tailored to the end user's sleep profile. Additionally, because the pillow is in the form of a lattice structure, increased air flow and minimal temperature hot spots are provided.

In one or more embodiments, modular bedding components are created with interlocking components so that smaller components can combined to form a larger component. For example, interlocking bedding components can be formed for applications where either a) the desired final size is larger than the print envelope or b) there is a desire to disassemble and reassemble the product for efficiencies of packaging and/or shipment. This concept is also applied to cases where the elimination of secondary fasteners is required or desired. The interlocking components cand be formed during the additive manufacturing process to form the lattice structure or may be attached to the lattice structure subsequent to additive manufacturing such as by an ultrasonic welding process. In embodiments where the interlocking component is formed after additive manufacturing of the lattice structure, the interlocking component can be formed of the same or a different polymeric composition as the polymeric lattice structure.

Figure 5:
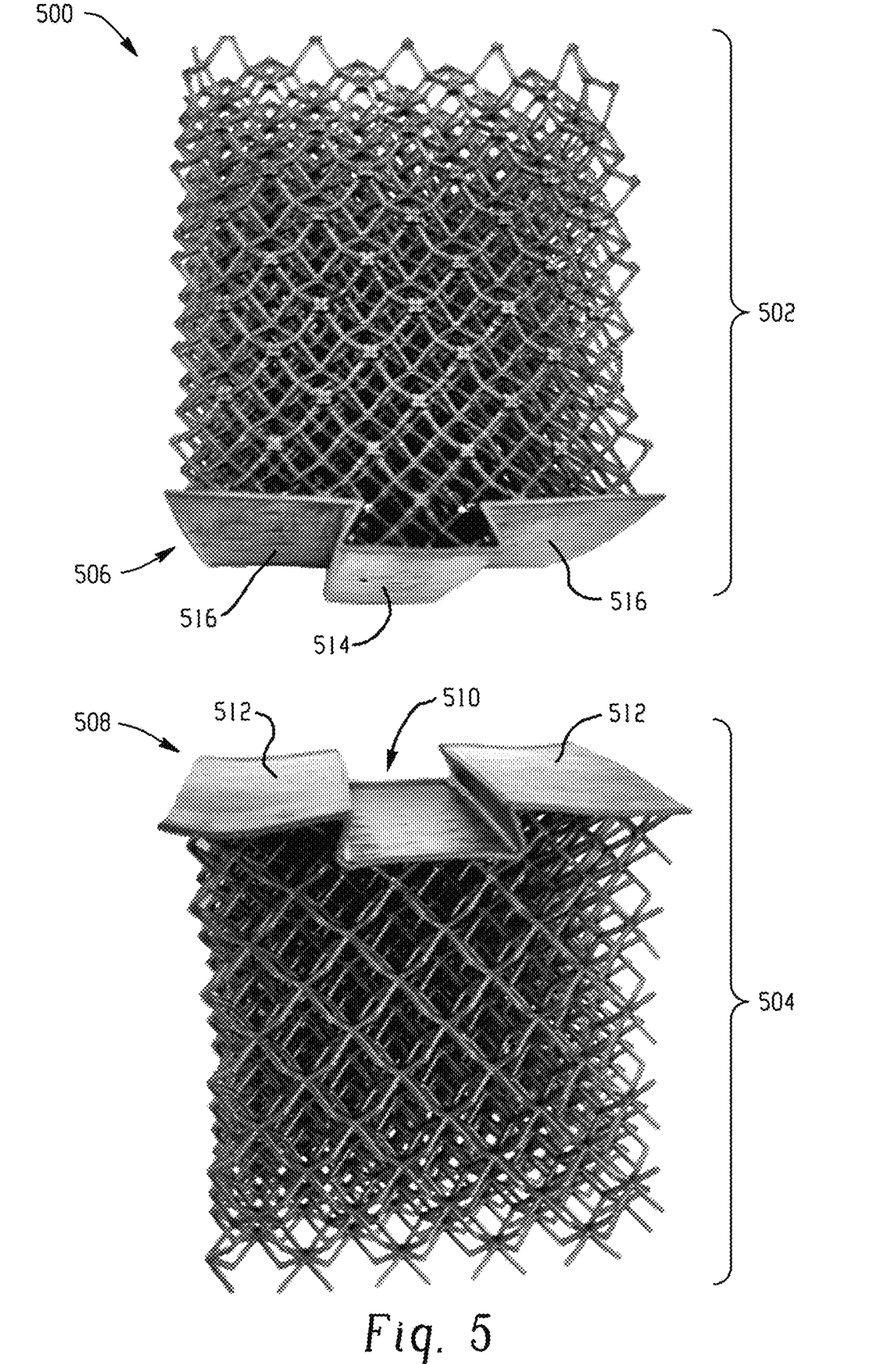
FIG. 5 illustrates a perspective view of two interlocking polymeric lattice structures for use in bedding products in accordance with one or more embodiments of the present invention.

As shown in FIG. 5, there is depicted a pair of additively manufactured lattice structures 500 configured to interlock with one another. The interlocking lattice structures 500 include a first lattice structure 502 and a second lattice structure 504. Although the lattice structures can take a variety of shapes and sizes, the first lattice structure 502 is a substantially square shaped lattice block including a selected surface including interlocking member 506. The second lattice structure 504 also includes a substantially square shaped lattice block including a selected surface having a complementary interlocking member 508 configured for slidable engagement with the interlocking member 506 of the first lattice structure 502. As shown, the interlocking member 508 of the second lattice block 504 includes a channel portion 510 relative to adjacent shoulder portions 512 and interlocking member 506 of the first lattice block 502 includes a raised portion 514 relative to shoulder portions 516, wherein the raised portion 514 and the channel portion 510 have a complementary shape such that the raised portion 503 can be slidably engaged within the channel portion 514 to interlock the first and second lattice blocks 502, 504 to one another. Although one surface is shown with the interlocking member, it should be apparent that additional surfaces can include the same (or different) interlocking member to provide assembly of a complete bedding component structure. In this manner, relatively large bedding components such as a mattress or foundation can be fabricated using additive manufacturing apparatuses that may not be able to fabricate relatively large envelopes to accommodate printing of these components. The interlocking members can be fixedly attached to the lattice structure or may be fabricated during the additive manufacturing process for forming the lattice structure. Advantageously, complex shapes such as the illustrated blocks 502, 504 can be fabricated using the additive manufacturing process.

Figure 6:
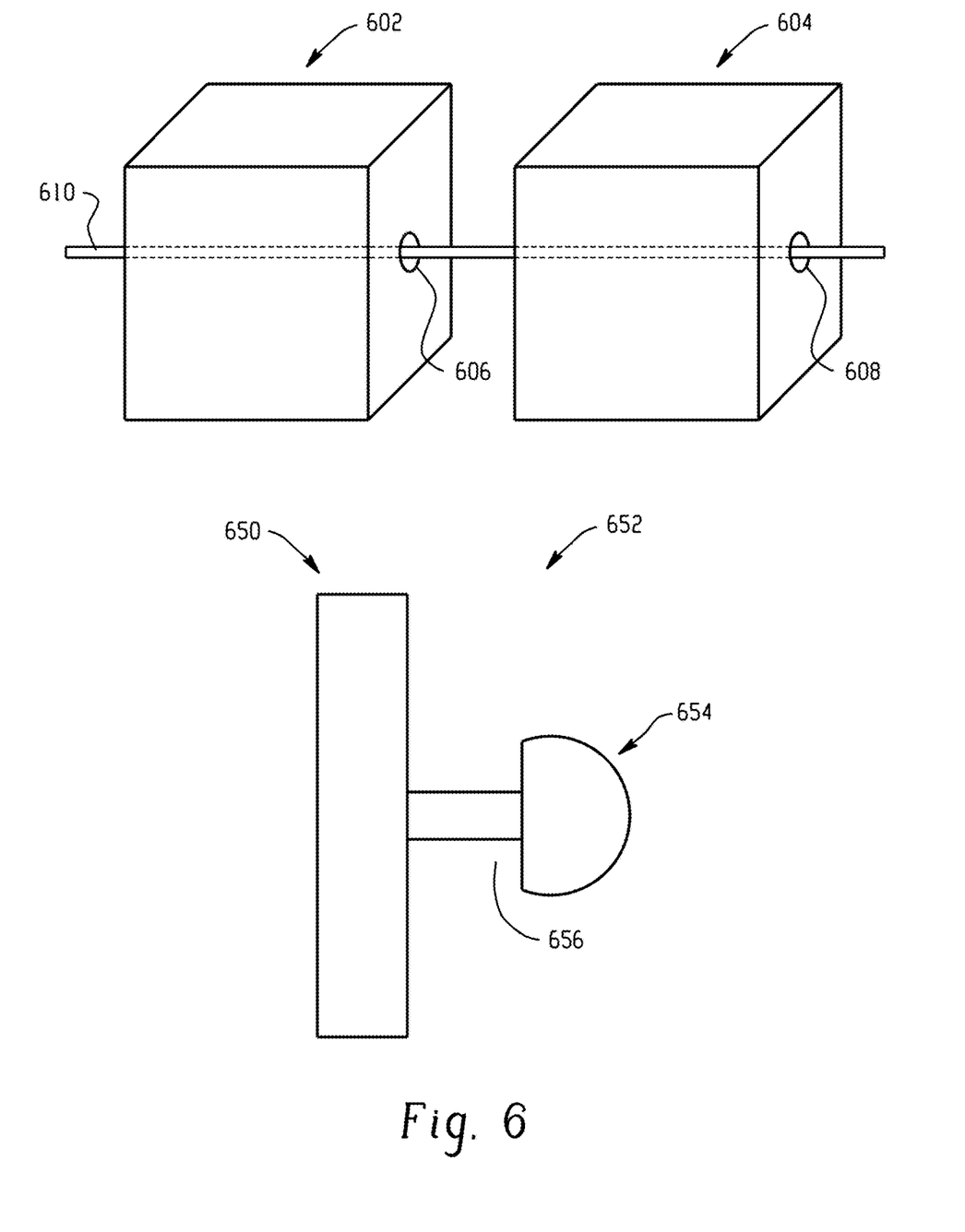
FIG. 6 illustrates alternative polymeric lattice structures including a cable locking arrangement and a ball and socket interlocking arrangement for use in bedding products in accordance with one or more embodiments of the present invention.

It should be apparent that the interlocking members are not intended to be limited nor is the configuration, shape and size of the lattice structures to be interlocked within one another be the same. FIG. 6 illustrate a perspective of alternative embodiments for interlocking lattice structures to form portions of or complete layers and/or portions of or a complete bedding component. The particular interlocking member can be a separate component or integrated into the lattice structure designed for the bedding component.

By way of example, the lattice structures can be connected with one another using a flexible cable that can be fixed at one end and linearly and/or serpentine threaded through adjacent lattice structure and fixedly attached to a terminal lattice structure. FIG. 6 depicts adjacent lattice structured generically illustrates as blocks 602 and 604 that include openings 606, 608, respectively, within the lattice structures that will accommodate a cable 610 passing therethrough. The ends of the cable 610 are fixedly attached or secured to the lattice surface to provide interlocking of multiple lattice structures. For example, the ends of the cable can include a washer, if needed, and be tied off.

Alternatively, the adjacent manufactured lattice structures 650, 652 are interlocked to one another using a ball and socket type arrangement provided on immediately opposing surfaces of the respective lattice structures. As shown, exemplary lattice structure 650 includes a protrusion 654 in the shape of a mushroom that is aligned with an opening 656 in lattice structure, wherein the opening dimension is effective to permit pressure fitment of the protrusion 654 into the opening 656. One or more surfaces of the lattice structures can include the ball and socket-type interlocking members. Moreover, each surface that does include the ball and socket type interlocking member can include one or more of these fastening members.

Figure 7:
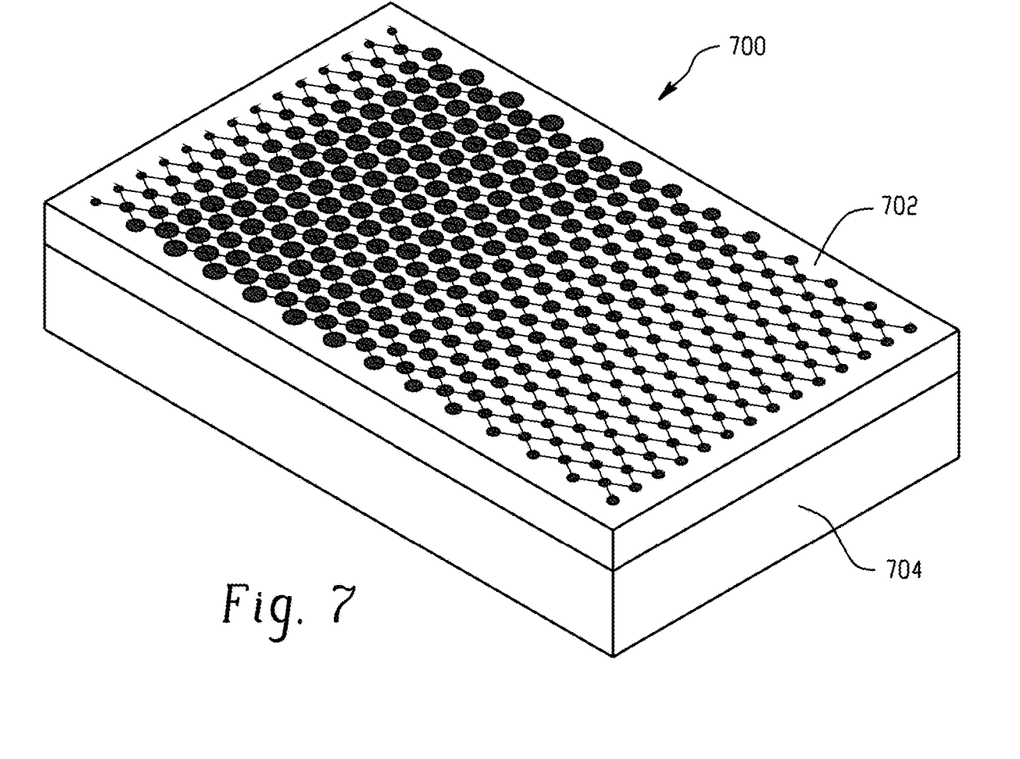
FIG. 7 illustrates a perspective view of a mattress including a layer having a plurality of cavities in accordance with one or more embodiments of the present invention.
Figure 8:
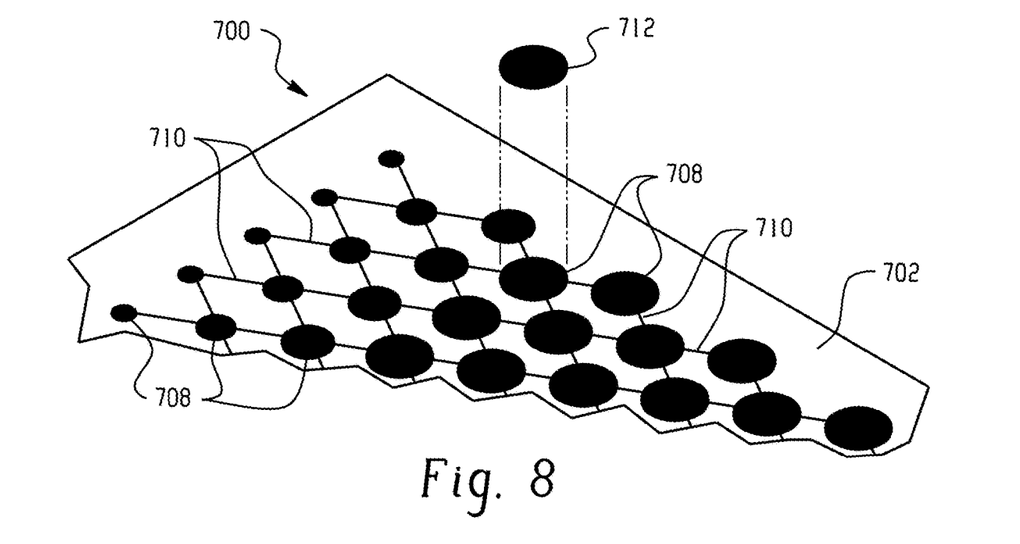
FIG. 8 illustrates an enlarged perspective view of the mattress of FIG. 7 including the layer having a plurality of cavities in accordance with one or more embodiments of the present invention.

In still other embodiments, additively manufactured bedding components can take the form of inserts within a conventional foam layer. The, additively manufactured inserts can be configured with a constant or variable density lattice structure to provided customized firmness and/or temperature control via increased airflow at specific locations within in a bedding component. For example, as shown in FIGS. 7-8, a mattress assembly 700 can include a first foam layer 702 overlying a mattress core 704, wherein the mattress core 704 can include one or more additional layers including foam, coils, air bladders, or combinations thereof. As shown more clearly in FIG. 8, the first foam layer 702 includes openings or recessed cavities 708 configured to receive the variable or constant density lattice inserts 712, one of which is shown, wherein the polymeric lattice inserts (a more detailed insert example is provided in FIG. 9) are additively manufactured to provide increased airflow and/or different firmness relative to the foam layer 702. The recessed cavities can be of the same size diameter or different size diameters as shown (see FIG. 8), which can be designed based on the information received from pressure and/or temperature mapping studies. Moreover, the spacing of the inserts within the layer 702 can be regular or irregular depending on the desired configuration. Optionally, channels 710 between adjacent cavities 708 can be fabricated within the foam layer to provide increased airflow and temperature control.

Figure 9:
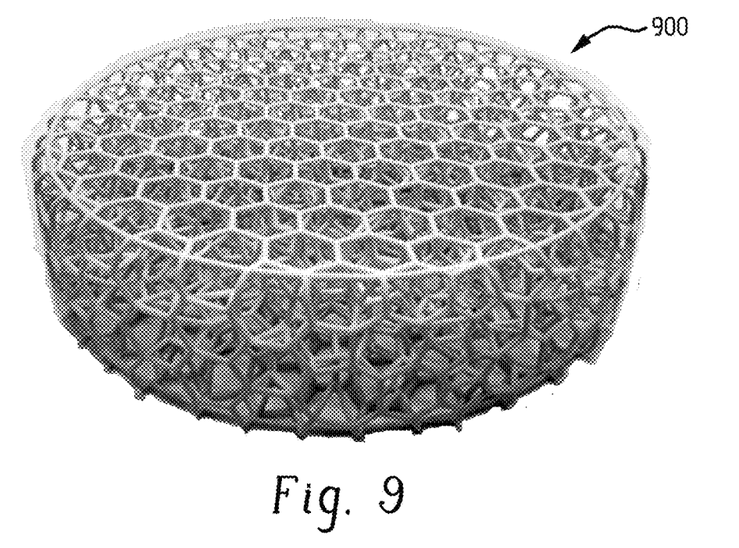
FIG. 9 illustrates a perspective view of a cylindrical shaped polymeric lattice insert in accordance with one or more embodiments of the present invention.

FIG. 9 illustrates an exemplary additive manufactured lattice structure insert that is in the form of a cylindrical disk 900. Although a cylindrical disk is shown, the additively manufactured lattice structure is not intended to be limited and can take many different three-dimensional geometric forms, simple or complex, as may be desired for different applications. The illustrated insert can have a constant lattice structure or a variable lattice structure.

Figure 10:
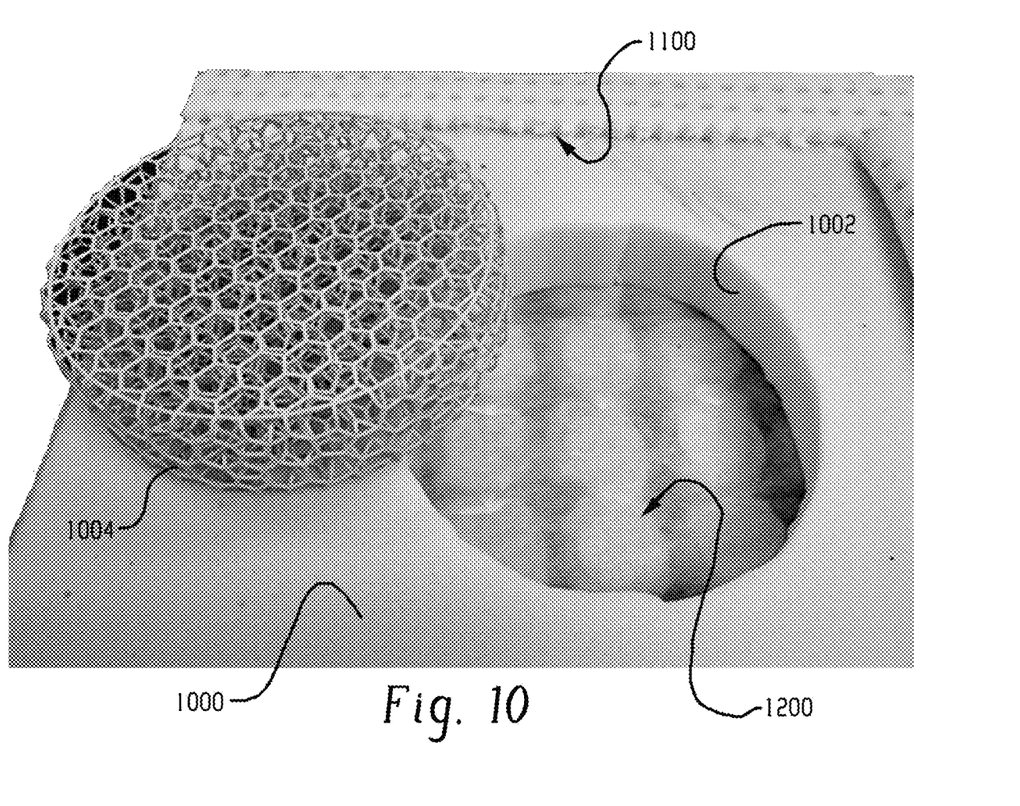
FIG. 10 illustrates a perspective view of a cylindrical shaped polymeric lattice insert and foam layer including a cavity for receiving the insert in accordance with one or more embodiments of the present invention.

In FIG. 10, a foam layer 1000 is shown including an opening 1002 dimensioned to accommodate polymeric lattice insert 1004. As shown, the opening 1002 extends through the foam layer. However, it should be apparent that a recessed cavity can be utilized, wherein relative to a top surface of the foam layer, the insert can be coplanar with the bottom surface or the top surface depending on the intended application. Generally, the cavity depth is substantially equal to a thickness of the insert such that a top surface of the insert is coplanar with the foam layer, although in some embodiments, the cavity depth can be less than or greater than the thickness of the insert so that the insert surface is not coplanar to the foam layer surface. As shown pulled away, a perforated foam layer 1100 can overlay the foam layer 1000 including the insert 1004. Underlying the foam layer 1000, there is depicted a mattress core 1200 including a plurality of pocketed springs.

Figure 11:
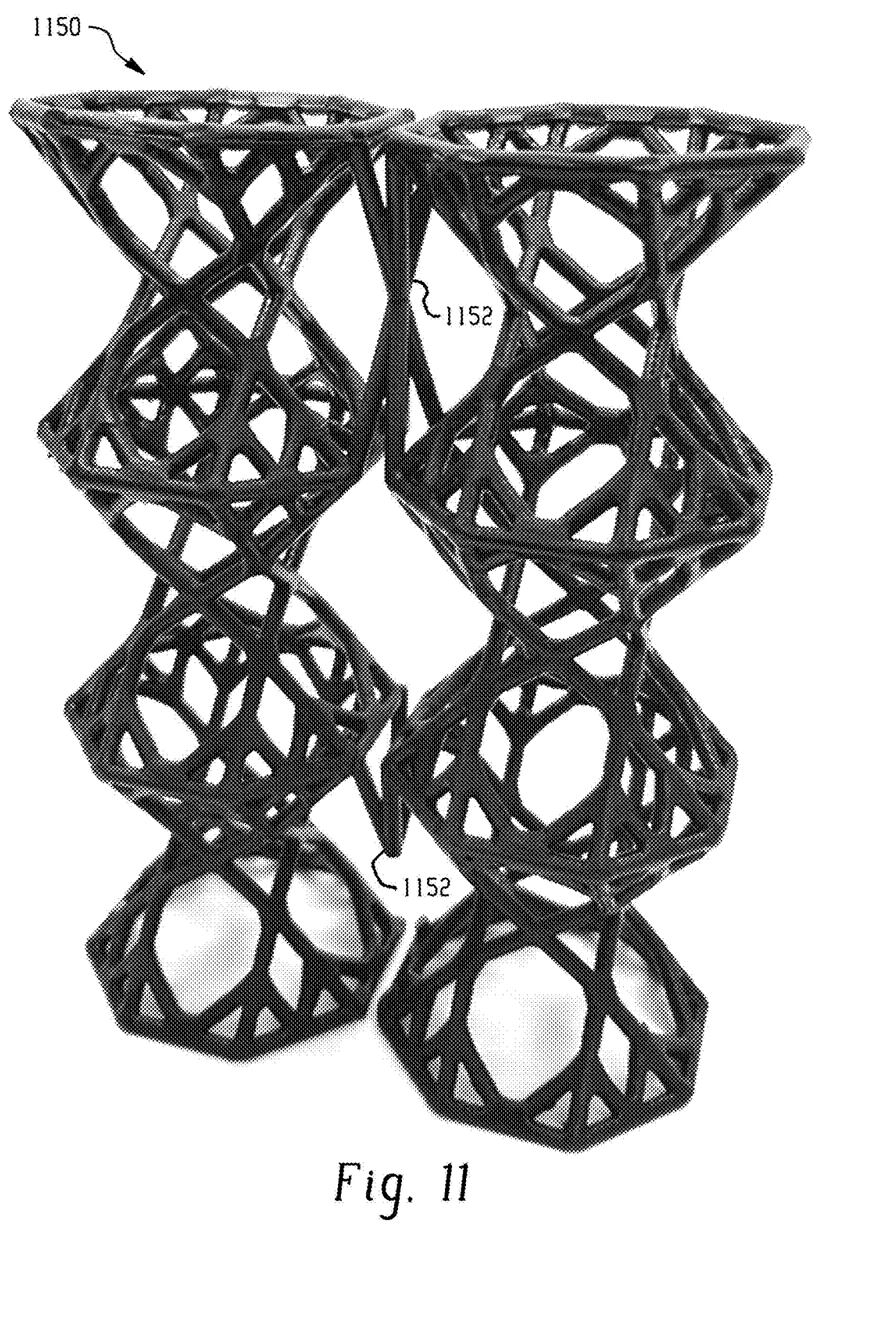
FIG. 11 illustrates a perspective view of a coil formed of a variable density polymeric lattice structure in accordance with one or more embodiments of the present invention.

In one or more embodiments, the additive manufacturing process can be used to fabricate coiled lattice structures 1150 such as that shown in FIG. 11. In this manner, steel springs, which are traditionally used in coil spring mattresses can be replaced to provide on-demand variable density design and eliminate the added mattress weight attributed to the use of the steel coils. The coiled lattice structures, two of which are shown, can be configured to provide a linear rate spring, a progressive rate spring, or a combination thereof. The polymeric lattice structures can have a complex or simple shape and can have a constant structure or a variable structure. Likewise, the polymeric lattice coil structures can be tethered to one another at one or more locations along a height dimension of the coils to form a coil string, wherein the tethered portion 1152 can be formed using the additive manufacturing process. Using coils of the same polymeric construction as other cushioning components also eases post-processing of the full product at time of disposal and eliminates several of the currently necessary supply chains.

Figure 12:
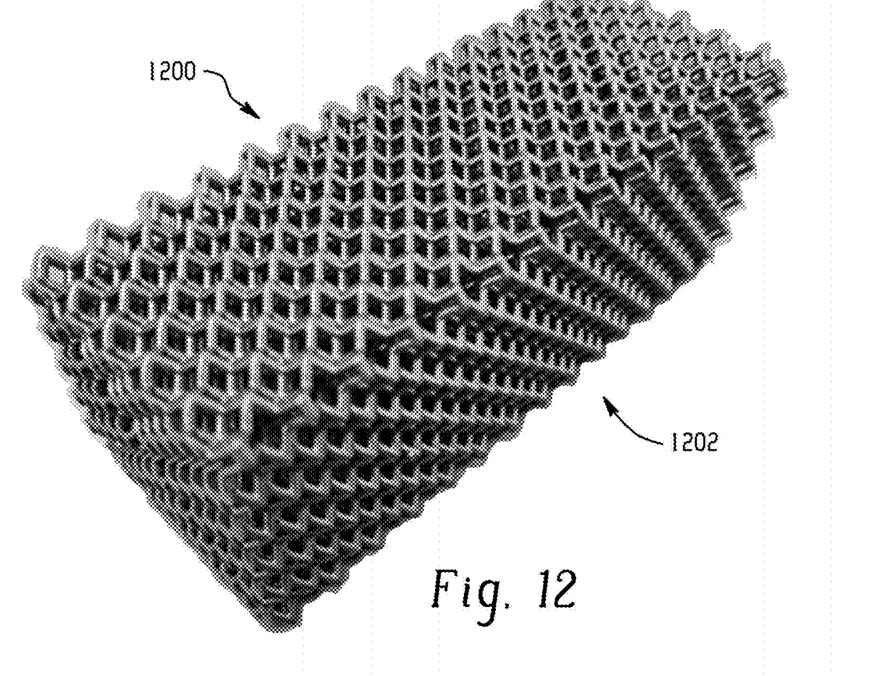
FIG. 12 illustrates a perspective view of a stored form of a reconfigurable polymeric lattice structure providing increased print volume and efficiency in accordance with one or more embodiments of the present invention.
Figure 13:
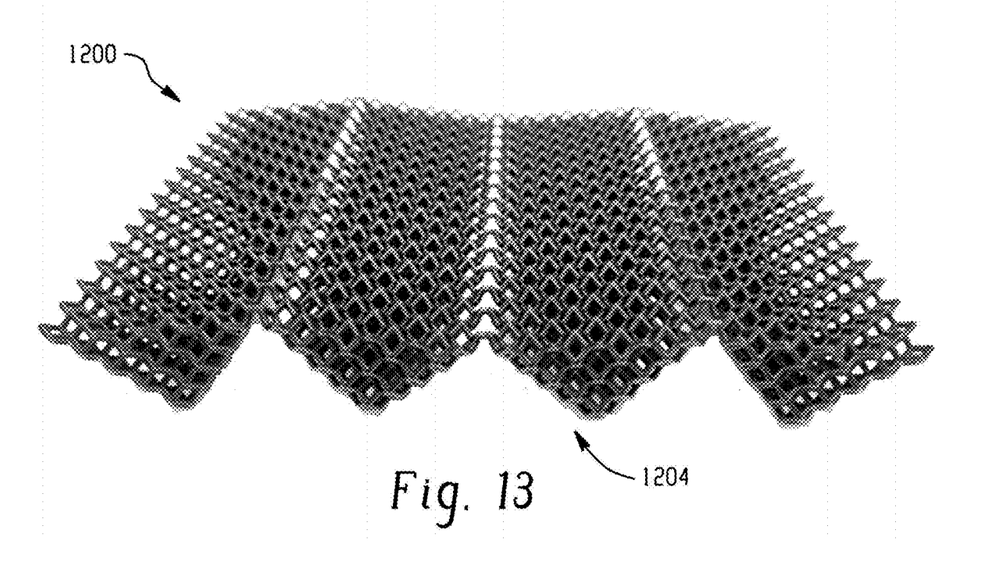
FIG. 13 illustrates a perspective view of a deployed form of the reconfigurable polymeric lattice structure of FIG. 11 in its deployed form in accordance with one or more embodiments of the present invention.

FIGS. 12-15 illustrate one or more embodiments including an exemplary reconfigurable additively manufactured lattice structure that can be utilized as an insert in a bedding component such as a multilayered mattress assembly. The reconfigurable lattice structure 1200 can have a variable or constant density lattice interconnected structure having a compact shape for storage and a deployed expanded shape with increased surface area for use as an insert in the bedding component. FIG. 12 illustrates the reconfigurable lattice structure 1200 in a compact rectangular shape 1202 and FIG. 13 illustrates the reconfigurable lattice structure 1200 in a deployed shape 1204, which provides interconnected multiple triangular shaped inserts so as to provide maximum print volume and efficiency with the added benefit of providing, in some embodiments, maximum surface area for the polymeric lattice structure yet when not in use can conveniently be stored in the rectangular shape, i.e., the most compact configuration, which can be arranged to maximize use of the storage space.

Figure 14:
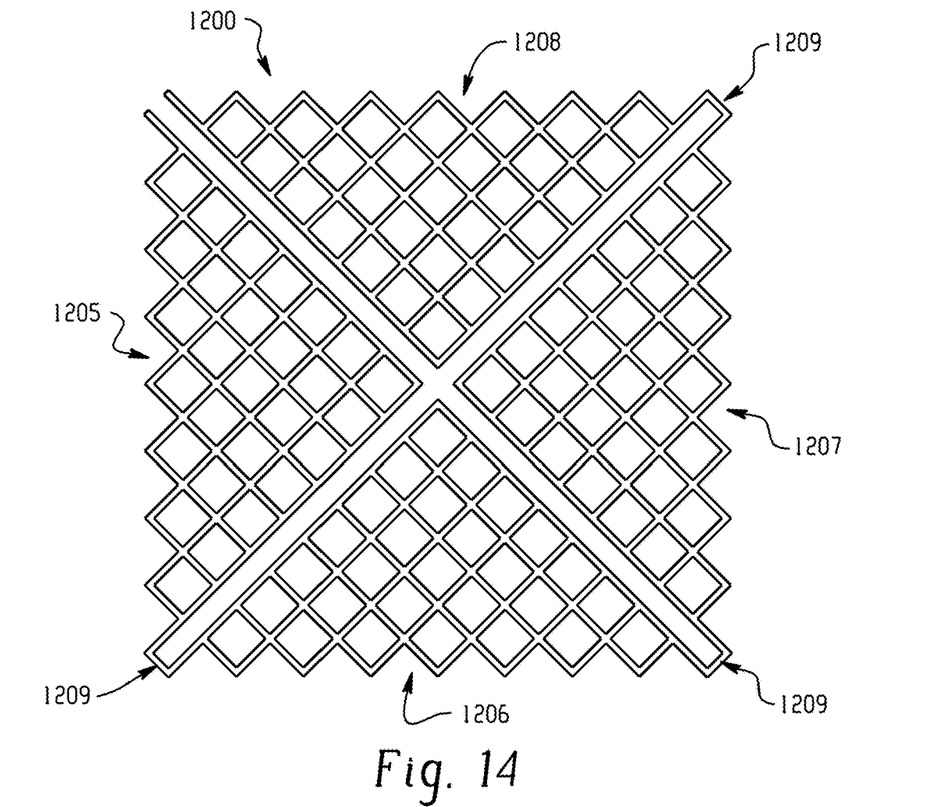
FIG. 14 illustrates an end-on view of the stored form of the reconfigurable polymeric lattice structure of FIG. 11 in accordance with one or more embodiments of the present invention.

FIG. 14 illustrates an end-on view of the reconfigurable lattice structure 1200 in the compact rectangular shape 1202 as shown in FIG. 12. The end-on view illustrates a square shape with interconnection 1209 at three of the four corners of the square shape.

Figure 15:
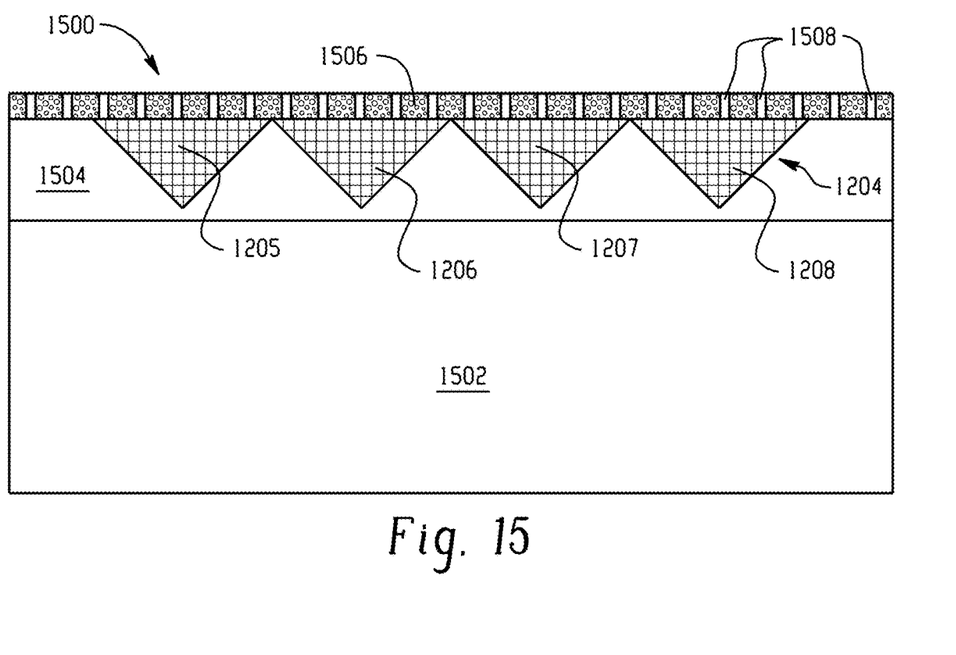
FIG. 15 illustrates a cross sectional view of an exemplary mattress assembly including the deployed form of the reconfigurable polymeric lattice structure of FIG. 11 in accordance with one or more embodiments of the present invention.

FIG. 15 illustrates a cross sectional view of a mattress assembly 1500 including the deployed form 1204 of the reconfigurable lattice structure 1200. The mattress assembly 1500 generally includes a mattress core 1502, foam layer 1504 overlying the mattress core 1502, and a perforated foam layer 1506 including a plurality of perforations 1508 extending from a top surface to a bottom surface thereof. Foam layer 104 includes compression cut triangle-shaped cavities extending into a portion of the foam layer 1504 dimensioned to accommodate the deployed form 1204 of the reconfigurable lattice structure shown in FIG. 12, wherein the four interconnected triangular shaped inserts 1205, 1206, 1207, and 1208 are inserted into the complementary-shaped cavities of the foam layer 1504. The deployed lattice structure 1204 can provide increased air flow by itself as well as in combination with perforated foam layer 1506 and also provide the foam layer 1504 with different firmness zones as may be desired for different applications. The lattice structure can be constructed to provide increased or decreased firmness relative to the foam layer 1404. Although a reconfigurable compact rectangular lattice structure is shown that can be reconfigured in a deployed configuration as an interconnected triangular shaped insert, the reconfigurable insert is not intended to be limited to such a shape. Other geometric shapes are contemplated, which can include the same interconnected shapes to different interconnected shapes when deployed. The additive manufacturing process permits the construction of complex structure that otherwise were previously not available. For example, the reconfigurable lattice structure can have a circular compact shape that can be reconfigured to provide interconnected half circles. Moreover, it should be apparent that the polymeric lattice structures in this and the other embodiments can be selectively placed to provide multiple zones within the bedding component so as to minimize pressure points and provide improved air flow for the bedding component.

Advantageously, additively manufactured lattice structures prototypes have been fabricated and demonstrated that the theoretical improvements predicted from pressure mapping and temperature mapping are actually observed in product testing. For example, evaporative capacity testing, which evaluates the thermal management properties of a mattress or mattress component, was done on the scale mock-ups of the additively manufactured lattice structures shown in FIGS. 9-10, and compared to a mock-up with a traditional solid foam block in place of illustrated variable lattice insert shown. This testing was also performed on the pillow prototypes as shown in FIG. 3. In both cases, the components either entirely made up of or using componentry with 3D-printed lattice structures performed markedly better in the comparative thermal analysis; at worst performing 100% better and at best performing 600% better. Moreover, the lattice structure can be selected to provide the bedding component a constant of variable firmness and resilience in its entirety or in selective locations within the bedding component as may be desired for different applications.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A bedding component comprising:
   a foam layer comprising one or more cavities; and
   one or more inserts, each insert defined by an additively manufactured variable density elastomeric lattice structure comprising variations within a strut defining the lattice structure in a selected one or more of a strut diameter, and a strut shape, wherein the variable density elastomeric polymeric lattice structure has a shape corresponding to at least a portion of the bedding component, wherein each insert is configured to be seated within a corresponding one of the one or more cavities and has a top surface coplanar with a top surface of the foam layer.

2. The bedding component of claim 1, wherein the bedding component is a pillow structure and the variable density elastomeric lattice structure.

3. The bedding component of claim 1, wherein the variable density elastomeric lattice structure is an insert configured to be inserted within a cavity of at least one layer of the bedding component.

4. The bedding component of claim 3, wherein at least one of the inserts is reconfigurable from a stored shape to a deployed shape, wherein the stored shape is different from the deployed shape and the deployed shape is configured to be inserted into more than one of the cavities in the foam layer.

5. The bedding component of claim 1, further comprising at least one additional variable density elastomeric lattice structure configured to interlock with the variable density elastomeric structure.

6. The bedding component of claim 1, wherein the bedding component comprises multiple layers and the foam layer including the variable density elastomeric lattice structure defines at least one layer or a portion of the at least one layer of the bedding component.

7. The bedding component of claim 1, wherein the bedding component comprises a multilayer mattress, a mattress topper, a pillow, a coil, or a portion of a mattress.

8. The bedding component of claim 1, wherein the bedding component is a multilayer mattress assembly further including a mattress core comprising a coil layer, wherein the coil layer comprises a plurality of cylindrically-shaped coils having a variable density elastomeric lattice structure.

9. The bedding component of claim 8, wherein the plurality of coils include a tethered portion between adjacent ones of the plurality of coils to form a string.

10. The mattress of claim 8, wherein the coil springs are configured to provide a linear spring rate.

11. The mattress of claim 8, wherein the coil springs are configured to provide a progressive spring rate.

12. The mattress of claim 8, wherein the coil springs are configured to provide a linear spring rate and a progressive spring rate.

13. A multilayer mattress assembly comprising:
    at least one layer comprising a plurality of cylindrically-shaped coil springs, wherein the cylindrically-shaped coil springs comprise additively manufactured variable density elastomeric cylindrically-shaped coil structures, wherein the variable density elastomeric coil structures comprise different strut shapes, or different cell diameters, or different strut diameters or combinations thereof, and wherein the elastomeric cylindrically-shaped coil structures are tethered with additively manufactured tethers to one another at locations along a height dimension.

14. A multilayered mattress assembly comprising:
    at least one layer comprising at least one additively variable density manufactured elastomeric lattice structure, wherein the at least one additively manufactured elastomeric lattice structure comprises at least one selected surface having an interlocking member configured to interlock with an adjacent additively manufactured elastomeric lattice structure having a complementary interlocking member configured to lockingly engage the interlocking member.

15. The multilayered mattress assembly of claim 14, wherein the interlocking member comprises a protrusion and the complementary interlocking member comprises an opening, wherein the protrusion is configured to pressure fit within the opening to connect the at least one additively manufactured elastomeric lattice structure with the adjacent additively manufactured elastomeric lattice structure.

16. The multilayered mattress assembly of claim 14, wherein the at least one layer is a mattress core comprising a coil layer, wherein the coil layer comprises a plurality of coils having the variable density elastomeric lattice structure.

17. The multilayered mattress assembly of claim 14, wherein the plurality of coils comprises a tethered portion between adjacent ones of the plurality of coils to form a string.

18. The multilayered mattress assembly of claim 14, wherein the at least one additively manufactured elastomeric lattice structure has a variable density.

19. The multilayered mattress assembly of claim 14, wherein the at least one layer comprising at least one additively manufactured elastomeric lattice structure further comprises a channel extending between one or more of the additively manufactured elastomeric lattice structure.

* * * * *